United States Patent Office 3,786,016
Patented Jan. 15, 1974

3,786,016
CARBANILATE DIOXOLANES AND DIOXANES AND THEIR UTILITY AS HERBICIDES
Eugene G. Teach, El Cerrito, Calif., assignor to Stauffer Chemical Company, New York, N.Y.
No Drawing. Filed Oct. 26, 1971, Ser. No. 192,485
Int. Cl. C07d *13/04, 15/04*
U.S. Cl. 260—340.7         43 Claims

ABSTRACT OF THE DISCLOSURE

Substituted carbanilate dioxolanes and dioxane compounds having the formula

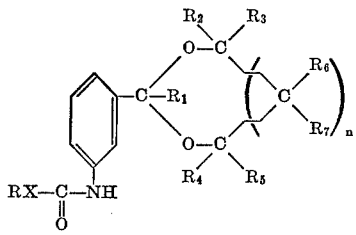

in which R is selected from the group consisting of lower alkyl, and benzyl; X is selected from the group consisting of oxygen and sulfur; $R_1$, $R_2$, $R_3$, $R_4$, $R_5$ and $R_7$ each are independently selected from the group consisting of hydrogen and lower alkyl; $R_6$ is selected from the group consisting of alkyl, haloalkyl, hydrogen, hydroxymethyl, lower alkoxy carbonyloxymethyl, S-lower alkylthio carbonyloxymethyl, N-lower alkyl carbamoyloxymethyl and N-phenylcarbamoyloxymethyl; and $n$ is 0 or 1. These compounds are useful as herbicides.

---

This invention relates to certain novel substituted carbanilate dioxolanes and dioxanes which are useful as herbicides. The compounds of the present invention are new compositions of matter and correspond to the formula

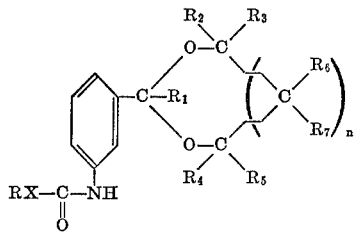

in which R is selected from the group consisting of lower alkyl and benzyl; X is selected from the group consisting of oxygen and sulfur; $R_1$, $R_2$, $R_3$, $R_4$, $R_5$ and $R_7$ are each independently selected from the group consisting of hydrogen and lower alkyl; $R_6$ is selected from the group consisting of alkyl, haloalkyl, hydrogen, hydroxymethyl, lower alkoxy carbonyloxymethyl, S-lower alkylthio carbonyloxymethyl, N-lower alkyl carbamoyloxymethyl and N-phenylcarbamoyloxymethyl; and $n$ is 0 or 1.

In the above description, the following preferred embodiments are intended for the various substituents: Alkyl preferably includes, unless otherwise provided for, those members which contain from 1 to 8 carbon atoms, inclusive, in both straight chain and branched chain configurations, for example, methyl, ethyl, n-propyl, isopropyl, n-butyl, isobutyl, tertiary-butyl, n-pentyl, isopentyl, neopentyl, hexyl, isohexyl, n-heptyl, iso-heptyl, n-octyl, iso-octyl, 2,4,4-trimethylpentyl, and the like; lower alkyl preferably includes, unless otherwise provided for, those members which contain from 1 to 6 carbon atoms, inclusive, in both straight chain and branched chain configurations; the term haloalkyl, preferably includes, unless otherwise provided for, those members which contain as halogens fluorine or chlorine from mono- to perhalogenation, including mixed halogenation, such as monochloromonofluoro, dichloromonofluoro, monochlorodifluoro and the like, as the alkyl portion the preferred embodiment includes 1 to 4 carbon atoms, inclusive, for example, monochloromethyl, perfluoroethyl, monochlorotertiary butyl and the like.

The compounds of this invention have been found to be active herbicides of a general type. That is, certain members of the class have been found to be herbicidally effective against a wide range of plant species. A method of controlling undesirable vegetation of the present invention comprises applying an herbicidally effective amount of the above-described compounds to the area or plant locus where control is desired.

An herbicide is used herein to mean a compound which controls or modifies the growth of plants. By a "growth controlling amount" is meant an amount of compound which causes a modifying effect upon the growth of plants. Such modifying effects include all deviations from natural development, for example, killing, retardation, defoliation, desiccation, regulation, stunting, trillering, stimulation, dwarfing and the like. By "plants" it is meant germinant seeds, emerging seedlings, and established vegetation, including the roots and above-ground portions.

The compounds of the present invention are prepared by several different methods, depending upon the nature of the starting materials and products desired. Synthesis of the starting materials can be found in several references in the literature. The following method is illustrative: Meta-nitrobenzaldehyde (wherein $R_1$, supra, is hydrogen), or meta-nitroacetophenone or higher phenones (wherein $R_1$, supra, is lower alkyl), are reacted with a suitable glycol, either a 1,2- or 1,3-glycol, to give the desired cyclic acetal. The corresponding cyclic acetal is reduced by conventional methods to give the corresponding meta-amino compound. The meta-amino compound is reacted with an appropriate chlorothiolformate or chloroformate to obtain the desired carbanilate substituted dioxolane or dioxane.

Particularly more illustrative of the above generally described method will be the following specific examples. Following the examples is a table of compounds which are prepared according to the procedures described and illustrated herein.

EXAMPLE I

Preparation of intermediates

2(3-nitrophenyl)5,5-dimethyl-1,3-dioxane: One hundred and six grams (106 g.) of m-nitrobenzaldehyde and 71 g. of 2,2-dimethyl-1,3-propylene glycol are combined with 200 ml. of benzene and 1 g. of p-toluene sulfonic acid and refluxed under a modified Dean-Stark apparatus until no more water is collected (approximately 15 ml.). The solution is filtered and the benzene removed under reduced pressure giving 160 g. of solid, M.P. 45–47° C. This is reduced without further purification.

2(m-aminophenyl)5,5-dimethyl-1,3-dioxane: Iron powder, 110 g., in a solvent consisting of 250 ml. ethyl alcohol and 200 ml. of water and 8 ml. of concentrated hydrochloric acid is heated to reflux with good mechanical stirring and 2(m-nitrophenyl)5,5-dimethyl-1,3-dioxane, 166 g., is added portionwise to maintain reflux. At the conclusion of addition the temperature is allowed to fall 5–10° C. and 8 g. of 50% sodium hydroxide is added and the slurry filtered hot through a pad of diatomaceous earth. Ethyl alcohol is removed under vacuum and the product is taken up in methylene chloride solution, separated from the water, dried over magnesium sulfate and stripped to give 133 g. of product, $n_D^{30}=1.5441$.

EXAMPLE II

Preparation of 2(m-S-methylthiocarbamylphenyl)5,5-dimethyl-1,3-dioxane: Twelve and four-tenths grams (12.4 g.) of 2(m-aminophenyl)5,5-dimethyl-1,3-dioxane is dissolved in 100 ml. of acetone containing 6.5 g. of triethylamine and 6.7 g. of methyl chlorothioformate is added portionwise with cooling and stirring. After a few minutes, the reaction mixture is poured into water and the product collected by filtration. There is obtained a yield of 13.4 g. of the title compound, M.P. 120–123° C.

EXAMPLE III

Preparation of intermediates

2(m-nitrophenyl)-2-methyl-1,3-dioxolane: One hundred and sixty-five grams (165 g.) of m-nitro acetophenone was combined with 62 g. of ethylene glycol in 300 ml. of benzene. One gram of p-toluene sulfonic acid was added and the mixture heated at reflux under a Dean-Stark apparatus until no more water came off. The product crystallized on cooling to give 204 g., M.P. 55–58° C.

2(m-aminophenyl)-2-methyl-1,3-dioxolane: Iron powder, 170 g., was slurried with 250 ml. of ethanol and 200 ml. of water and 10 ml. of concentrated hydrochloric acid was added and the mixture heated to reflux with strong stirring. The nitro compound, 2(m-nitrophenyl)-2-methyl dioxolane was added portionwise to maintain reflux. When addition was complete, 10 g. of 50% sodium hydroxide was added and the mixture filtered to remove the iron and iron oxide. Ethanol was removed under vacuum and the product taken up in methylene chloride, separated and dried and the solvent stripped under vacuum. Yield was 145 g., M.P. 68–70° C. A pure sample melted at 76–78° C.

EXAMPLE IV

Preparation of 2(m-S-methylthiocarbamylphenyl)4,5,5-tetramethyl-1,3-dioxolane: Eight and eight-tenths grams (8.8 g.) of 2(m-aminophenyl)4,4,5,5-tetramethyldioxolane was dissolved in 100 ml. of acetone, 3.5 g. of pyridine was added and 4.5 g. of methylchlorothioformate was added portionwise with cooling. The mixture was poured into water and the product filtered off and dried. There was obtained a yield of 10.8 g. of a solid, the title compound, M.P. 106–108° C.

EXAMPLE V

Preparation of 2(m-O-isopropylcarbamylphenyl)2,4-dimethyl-1,3-dioxolane: Eleven and six-tenths grams (11.6 g.) of 2(m-amonophenyl)2,4-dimethyl-1,3-dioxolane was dissolved in 100 ml. of methylene chloride, 5 g. of pyridine was added and 7.4 g. of isopropyl chloroformate was added portionwise. The mixture was poured into water and the solvent layer separated and dried over magnesium sulfate and the solvent removed under vacuum. There was obtained in this way 15 g. of the title compound, $n_D^{30}=1.5182$.

The following is a table of the compounds which are prepared according to the aforementioned procedures. Compound numbers have been assigned to them and are used for identification throughout the balance of the specification.

TABLE I

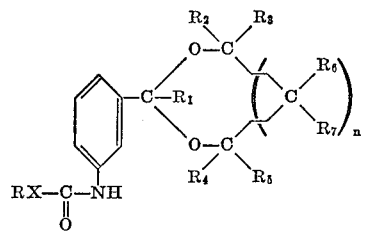

| Compound number | RX | $R_1$ | $R_2$ | $R_3$ | $R_4$ | $R_5$ | n | $R_6$ | $R_7$ | M.P. °C. or, $n_D^{30}$ |
|---|---|---|---|---|---|---|---|---|---|---|
| 1 | $CH_3O$ | H | H | H | H | H | 0 | | | Glass |
| 2 | $CH_3S$ | H | H | H | H | H | 0 | | | 1.6264 |
| 3 | $CH_3O$ | $CH_3$ | H | H | H | H | 0 | | | 90 |
| 4 | $CH_3S$ | $CH_3$ | H | H | H | H | 0 | | | 1.5864 |
| 5 | $CH_3O$ | $CH_3$ | $CH_3$ | H | H | H | 0 | | | 1.5299 |
| 6 | $i$-$C_3H_7O$ | $CH_3$ | $CH_3$ | H | H | H | 0 | | | 1.5182 |
| 7 | $CH_3S$ | $CH_3$ | $CH_3$ | H | H | H | 0 | | | 1.5660 |
| 8 | $i$-$C_3H_7S$ | $CH_3$ | $CH_3$ | H | H | H | 0 | | | 1.5498 |
| 9 | $CH_3O$ | H | H | H | H | H | 1 | $CH_3$ | $CH_3$ | 193–196 |
| 10 | $i$-$C_3H_7O$ | H | H | H | H | H | 1 | $CH_3$ | $CH_3$ | 195–198 |
| 11 | $CH_3S$ | H | H | H | H | H | 1 | $CH_3$ | $CH_3$ | 120–123 |
| 12 | $CH_3O$ | $CH_3$ | H | H | H | H | 1 | $CH_3$ | $CH_3$ | Glass |
| 13 | $CH_3S$ | $CH_3$ | H | H | H | H | 1 | $CH_3$ | $CH_3$ | 1.5542 |
| 14 | $CH_3S$ | H | $CH_3$ | $CH_3$ | $CH_3$ | H | 1 | H | H | 1.5670 |
| 15 | $i$-$C_3H_7S$ | H | $CH_3$ | $CH_3$ | $CH_3$ | H | 1 | H | H | 1.5508 |
| 16 | $t$-$C_4H_9S$ | H | $CH_3$ | $CH_3$ | $CH_3$ | H | 1 | H | H | 1.5504 |
| 17 | $CH_3S$ | H | H | H | H | H | 1 | $C_2H_5$ | $C_2H_5$ | 1.5564 |
| 18 | $CH_3O$ | H | $i$-$C_3H_7$ | H | H | H | 1 | $CH_3$ | $CH_3$ | 196–197 |
| 19 | $CH_3S$ | H | $i$-$C_3H_7$ | H | H | H | 1 | $CH_3$ | $CH_3$ | 1.5513 |
| 20 | $i$-$C_3H_7$ | H | $i$-$C_3H_7$ | H | H | H | 1 | $CH_3$ | $CH_3$ | 1.5410 |
| 21 | $t$-$C_4H_9S$ | H | $i$-$C_3H_7$ | H | H | H | 1 | $CH_3$ | $CH_3$ | 1.5363 |
| 22 | $CH_3S$ | H | H | H | H | H | 1 | $CH_2Cl$ | $CH_3$ | 1.5678 |
| 23 | $CH_3S$ | H | H | H | H | H | 1 | $CH_2OH$ | $CH_3$ | 1.5685 |
| 24 | $CH_3S$ | H | H | H | H | H | 1 | $CH_2OCOC_2H_5$ | $CH_3$ | 1.5470 |
| 25 | $CH_3S$ | H | H | H | H | H | 1 | $CH_2OCO$-$t$-$C_4H_9$ | $CH_3$ | 1.5450 |
| 26 | $CH_3S$ | H | H | H | H | H | 1 | $CH_2OCONHCH_3$ | $CH_3$ | 1.5519 |
| 27 | $CH_3S$ | H | H | H | H | H | 1 | $CH_2OCONHC_6H_5$ | $CH_3$ | 1.5778 |
| 28 | $CH_3S$ | H | H | H | H | H | 1 | $CH_2OCOS$-$t$-$C_4H_9$ | $CH_3$ | 1.5519 |
| 29 | $C_2H_5S$ | H | H | H | H | H | 1 | $CH_3$ | $CH_3$ | 1.5620 |
| 30 | $n$-$C_3H_7S$ | H | H | H | H | H | 1 | $CH_3$ | $CH_3$ | 1.5580 |
| 31 | $i$-$C_3H_7S$ | H | H | H | H | H | 1 | $CH_3$ | $CH_3$ | 1.5535 |
| 32 | $n$-$C_4H_9S$ | H | H | H | H | H | 1 | $CH_3$ | $CH_3$ | 82–84 |
| 33 | $t$-$C_4H_9S$ | H | H | H | H | H | 1 | $CH_3$ | $CH_3$ | 111–113 |
| 34 | $C_6H_5CH_2S$ | H | H | H | H | H | 1 | $CH_3$ | $CH_3$ | 1.5953 |
| 35 | $CH_3O$ | H | H | H | H | H | 1 | $CH_3$ | $C_2H_5$ | 1.5568 |
| 36 | $CH_3S$ | H | H | H | H | H | 1 | $CH_3$ | $C_2H_5$ | 1.5645 |
| 37 | $n$-$C_3H_7S$ | H | H | H | H | H | 1 | $CH_3$ | $C_2H_5$ | 1.5566 |
| 38 | $n$-$C_4H_9S$ | H | H | H | H | H | 1 | $CH_3$ | $C_2H_5$ | 1.5507 |
| 39 | $CH_3O$ | H | H | H | H | H | 1 | $CH_3$ | $n$-$C_3H_7$ | 1.5206 |
| 40 | $CH_3S$ | H | H | H | H | H | 1 | $CH_3$ | $n$-$C_3H_7$ | 1.5591 |
| 41 | $n$-$C_4H_9S$ | H | H | H | H | H | 1 | $CH_3$ | $n$-$C_3H_7$ | 1.5478 |
| 42 | $CH_3O$ | H | H | H | H | H | 1 | $C_2H_5$ | $n$-$C_4H_9$ | 1.5420 |
| 43 | $CH_3S$ | H | H | H | H | H | 1 | $C_2H_5$ | $n$-$C_4H_9$ | 1.5524 |
| 44 | $CH_3O$ | H | $CH_3$ | $CH_3$ | $CH_3$ | $CH_3$ | 0 | | | 104–106 |
| 45 | $CH_3S$ | H | $CH_3$ | $CH_3$ | $CH_3$ | $CH_3$ | 0 | | | 106–108 |

HERBICIDAL SCREENING TESTS

As previously mentioned, the herein-described compounds produced in the above-described manner are phytotoxic compounds which are useful and valuable in controlling the growth of various plant species. Compounds of this invention are tested as herbicides in the following manner.

Pre-emergence herbicide test: On the day preceding treatment, seeds of seven different weed species are planted in individual rows using one species per row across the width of the flat. The seeds used are hairy crabgrass (*Digitaris sanguinalis* (L.) Scop.), yellow foxtail (*Setaria glauca* (L.) Beauv.), watergrass (*Echinochloa crusgalli* (L.) Beauv.), California red oat (*Avena sativa* (L.)), redroot pigweed (*Amaranthus retroflexus* (L.)), Indian mustard (*Brassica juncea* (L.) Coss.) and curly dock (*Rumex crispus* (L.)). Ample seeds are planted to give about 20 to 50 seedlings per row, after emergence, depending on the size of the plants. The flats are watered after planting.

The spraying solution is prepared by dissolving 50 mg. of the test compound in 3 ml. of a solvent, such as acetone, water, alcohol or dimethylformamide, containing 1% Tween 20® (polyoxyethylene sorbitan monolaurate). When dimethylformamide is used, only 0.5 ml. or less is used to dissolve the compound. Another solvent is used to make the volume up to 3 ml. The following day after planting, each flat is sprayed at the rate of 20 pounds of the candidate compound per 143 gallons of solution per acre. An atomizer is used to spray the solution onto the soil surface. The flats are placed in a greenhouse at 70–85° F. and watered regularly by sprinkling. Two weeks after treatment, the degree of weed control is determined by comparing the amount of germination and growth of each weed in the treated flats with weeds in several untreated control flats. The rating system is as follows:

0=no significant injury (approximately 0–10 percent control)
3=slight injury (approximately 10–40 percent control)
6=moderate injury (approximately 40–70 percent control)
9=severe injury or death (approximately 70–100 percent control)

An activity index is used to represent the total activity on all seven weed species. The activity index is the sum of the numbers divided by 3, so that an activity index of 21 represents complete control of all seven weeds. The results of this test are reported in Table II.

Post-emergency herbicide test: Seeds of five weed species, including hairy crabgrass, watergrass, California red oats, Indian mustard, and curly dock and one crop, pinto beans (*Phaseolus vulgaris*), are planted in flats as described above for pre-emergence screening. The flats are placed in the greenhouse at 72–85° F. and watered daily with a sprinkler. About 10 to 14 days after planting, when the primary leaves of the bean plant are almost fully expanded and the first trifoliate leaves are just starting to form, the plants are sprayed. The spray is prepared by weighing out 50 mg. of the test compound, dissolving it in 5 ml. of acetone containing 1% Tween 20® (polyoxyethylene sorbitan monolaurate) and then adding 5 ml. of water. The solution is sprayed on the foliage using an atomizer. The spray concentration is 0.5% and the rate would be approximately 20 lb./acre if all of the spray were retained on the plant and the soil, but some spray is lost so it is estimated that the application rate is approximately 12.5 lb./acre.

Beans are used to detect defoliants and plant growth regulators. The beans are trimmed to two or three plants per flat by cutting off the excess weaker plants several days before treatment. The treated plants are placed back in the greenhouse and care is taken to avoid sprinkling the treated foliage with water for three days after treatment. Water is applied to the soil by means of a slow stream from a watering hose taking care not to wet the foliage.

Injury rates are recorded 14 days after treatment. The rating system is the same as described above for the pre-emergence tests where (0), (3), (6), and (9) are used for the different rates of injury and control. The injury symptoms are also recorded. The maximum activity index for complete control of all the species in the post-emergence screening test is 18. This index represents the sum of the rating numbers obtained with the six plant species used in the test divided by 3. The herbicide activity index is shown in Table II.

TABLE II.—HERBICIDAL ACTIVITY SCREENING RESULTS

| Compound number | Herbicidal activity index [1] | |
|---|---|---|
| | Pre-emergence (20 lb./a.) | Post-emergence (12.5 lb./a.) |
| 1 | 0 | 3 |
| 2 | 0 | 8 |
| 3 | 2 | 4 |
| 4 | 13 | 13 |
| 5 | 3 | 8 |
| 6 | 10 | 11 |
| 7 | 6 | 11 |
| 8 | 0 | 8 |
| 9 | 7 | 4 |
| 10 | 4 | 4 |
| 11 | 19 | 18 |
| 12 | 2 | 1 |
| 13 | 9 | 11 |
| 14 | 8 | 8 |
| 15 | 4 | 0 |
| 16 | 2 | 3 |
| 17 | 16 | 16 |
| 18 | 0 | 6 |
| 19 | 8 | 13 |
| 20 | 0 | 4 |
| 21 | 0 | 4 |
| 22 | 10 | 9 |
| 23 | 4 | 8 |
| 24 | 5 | 10 |
| 25 | 5 | 9 |
| 26 | 9 | 9 |
| 27 | 7 | 10 |
| 28 | 0 | 8 |
| 29 | 9 | 12 |
| 30 | 2 | 7 |
| 31 | 5 | 8 |
| 32 | 3 | 9 |
| 33 | 0 | 6 |
| 34 | 2 | 3 |
| 35 | 8 | 12 |
| 36 | 17 | 16 |
| 37 | 7 | 9 |
| 38 | 10 | 11 |
| 39 | 6 | 8 |
| 40 | 16 | 15 |
| 41 | 12 | 12 |
| 42 | 8 | 10 |
| 43 | 12 | 13 |
| 44 | 10 | 14 |
| 45 | 9 | 14 |

[1] 21=70–100% control of all seven plant species tested pre-emergence.
18=70–100% control of all six plant species tested post-emergence.

The compounds of the present invention are used as pre-emergence or post-emergence herbicides and are applied in a variety of ways at various concentrations. In practice, the compounds are formulated with an inert carrier, utilizing methods well-known to those skilled in the art, thereby making them suitable for application as dusts, sprays, or drenches and the like, in the form and manner required. The mixtures can be dispersed in water with the aid of a wetting agent or they can be employed in organic liquid compositions, oil and water, water in oil emulsions, with or without the addition of wetting, dispersing or emulsifying agents. An herbicidally effective amount depends upon the nature of the seeds or plants to be controlled and the rate of application varies from 1 to approximately 50 pounds per acre.

The phytotoxic compositions of this invention employing an herbicidally effective amount of the compound described herein are applied to the plants in the conventional manner. Thus, the dust and liquid compositions can be applied to the plant by the use of power-dusters, boom and hand sprayers and spray-dusters. The compositions can also be applied from airplanes as a dust or a spray because they are effective in very low dosages. In order to modify or control growth of germinating seeds or emerging seedlings, as a typical example, the dust and liquid compositions are applied to the soil according to conventional methods and are distributed in the soil to a depth of at least ½ inch below the soil surface. It is not necessary that the phytotoxic compositions be admixed with the soil particles and these compositions can be applied merely by spraying or sprinkling the surface of the soil. The phytotoxic compositions of this invention can also be applied by addition to irrigation water supplied to the field to be treated. This method of application permits the penetration of the compositions into the soil as the water is absorbed therein. Dust compositions, granular compositions or liquid formulations applied to the surface of the soil can be distributed below the surface of the soil by conventional means such as discing, dragging or mixing operations.

The phytotoxic compositions of this invention can also contain other additaments, for example, fertilizers, pesticides and the like, used as adjuvant or in combination with any of the above-described adjuvants. Other phytotoxic compounds useful in combination with the above-described compounds include, for example, 2,4-dichlorophenoxyacetic acids, 2,4,5-trichlorophenoxyacetic acid, 2-methyl-4-chlorophenoxyacetic acid and the salts, esters and amides thereof; triazine derivatives, such as 2,4-bis(3-methoxypropylamino) - 6 - methyl-thio-S-triazine; 2-chloro-4-ethylamino-6-isopropylamino-S-triazine, and 2-ethylamino-4-isopropylamino - 6 - methylmercapto-S-triazine, urea derivatives, such as 3-(3,4-dichlorophenyl)-1,1-dimethyl urea and 3-(p-chlorophenyl)-1,1-dimethyl urea and acetamides such as N,N-diallyl-α-chloroacetamide, N-(α-chloroacetyl)hexamethylene imine, and N,N-diethyl-α-bromacetamide, and the like; benzoic acids such as 3-amino-2,5-dichlorobenzoic; and thiocarbamates, such as S-propyl dipropylthiocarbamate; S-ethyl-dipropylthiocarbamate, S - ethylcyclohexyl-ethyl-thiocarbamate, S-ethyl hexahydro-1H-azepine-1-carbothioate and the like. Fertilizers useful in combination with the active ingredients include, for example, ammonium nitrate, urea and superphosphate. Other useful additaments include materials in which plant organisms take root and grow, such as compost, manure, humus, sand and the like.

The concentration of a compound of the present invention, constituting an effective amount in the best mode of administration in the utility disclosed, is readily determinable by those skilled in the art.

Various changes and modifications are possible without departing from the spirit and scope of the invention described herein and will be apparent to those skilled in the art to which it pertains. It is accordingly intended that the present invention shall only be limited by the scope of the claims.

What is claimed is:

1. A compound having the formula

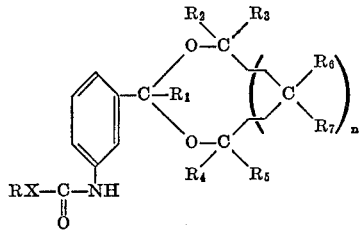

in which R is selected from the group consisting of lower alkyl and benzyl; X is selected from the group consisting of oxygen and sulfur; $R_1$, $R_2$, $R_3$, $R_4$, $R_5$ and $R_7$ each are independently selected from the group consisting of hydrogen and lower alkyl; $R_6$ is selected from the group consisting of alkyl, haloalkyl, containing fluorine or chlorine and having 1 to 4 carbon atoms, inclusive, hydrogen, hydroxymethyl, lower alkoxy carbonyloxymethyl, S-lower alkylthio carbonyloxymethyl, N-lower alkyl carbamoyloxymethyl and N-phenylcarbamoyloxymethyl; and $n$ is 0 or 1.

2. A compound according to claim 1 in which R is lower alkyl; X is oxygen; $R_1$, $R_2$, $R_3$, $R_4$ and $R_5$ are each hydrogen; and $n$ is 0.

3. A compound according to claim 2 in which R is methyl.

4. A compound according to claim 1 in which R is lower alkyl, X is sulfur; $R_1$, $R_2$, $R_3$, $R_4$ and $R_5$ are each hydrogen; and $n$ is 0.

5. A compound according to claim 4 in which R is methyl.

6. A compound according to claim 1 in which R is lower alkyl, X is oxygen, $R_1$ is lower alkyl, $R_2$, $R_3$, $R_4$ and $R_5$ are each hydrogen and $n$ is 0.

7. A compound according to claim 6 in which R is methyl and $R_1$ is methyl.

8. A compound according to claim 1 in which R is lower alkyl, X is sulfur, $R_1$ is lower alkyl, $R_2$, $R_3$, $R_4$ and $R_5$ are each hydrogen and $n$ is 0.

9. A compound according to claim 8 in which R is methyl, and $R_1$ is methyl.

10. A compound according to claim 1 in which R is lower alkyl, X is oxygen, $R_1$ and $R_2$ are each independently lower alkyl, $R_3$, $R_4$ and $R_5$ are each hydrogen, and $n$ is 0.

11. A compound according to claim 10 in which R is methyl, $R_1$ and $R_2$ are each methyl.

12. A compound according to claim 10 in which R is isopropyl, $R_1$ and $R_2$ are each methyl.

13. A compound according to claim 1 in which R is lower alkyl, X is sulfur, $R_1$ and $R_2$ are each independently lower alkyl, $R_3$, $R_4$ and $R_5$ are each hydrogen, and $n$ is 0.

14. A compound according to claim 13 in which R is methyl, $R_1$ and $R_2$ are each methyl.

15. A compound according to claim 13 in which R is isopropyl, $R_1$ and $R_2$ are each methyl.

16. A compound according to claim 1 in which R is lower alkyl; X is oxygen; $R_1$, $R_2$, $R_3$, $R_4$ and $R_5$ are each hydrogen; $n$ is 1; $R_6$ and $_7$ are each independently lower alkyl.

17. A compound according to claim 16 in which R is methyl, $R_6$ and $R_7$ are each methyl.

18. A compound according to claim 16 in which R is isopropyl, $R_6$ and $R_7$ are each methyl.

19. A compound according to claim 16 in which R is methyl, $R_6$ is methyl and $R_7$ is ethyl.

20. A compound according to claim 16 in which R is methyl, $R_6$ is methyl and $R_7$ is n-propyl.

21. A compound according to claim 16 in which R is methyl, $R_6$ is ethyl and $R_7$ is n-butyl.

22. A compound according to claim 1 in which R is lower alkyl, X is sulfur, $R_1$, $R_2$, $R_3$, $R_4$ and $R_5$ are each hydrogen, $n$ is 1, $R_6$ and $R_7$ are each independently lower alkyl.

23. A compound according to claim 22 in which R is methyl, $R_6$ and $R_7$ are each methyl.

24. A compound according to claim 22 in which R is methyl, $R_6$ and $R_7$ are each ethyl.

25. A compound according to claim 22 in which R is ethyl, $R_6$ and $R_7$ are each methyl.

26. A compound according to claim 22 in which R is n-propyl, $R_6$ and $R_7$ are each methyl.

27. A compound according to claim 22 in which R is isopropyl, $R_6$ and $R_7$ are each methyl.

28. A compound according to claim 22 in which R is n-butyl, $R_6$ and $R_7$ are each methyl.

29. A compound according to claim 22 in which R is t-butyl, $R_6$ and $R_7$ are each methyl.

30. A compound according to claim 22 in which R is methyl, $R_6$ is methyl and $R_7$ is ethyl.

31. A compound according to claim 22 in which R is n-propyl, $R_6$ is methyl and $R_7$ is ethyl.

32. A compound according to claim 22 in which R is n-butyl, $R_6$ is methyl and $R_7$ is ethyl.

33. A compound according to claim 22 in which R is methyl, $R_6$ is methyl and $R_7$ is n-propyl.

34. A compound according to claim 22 in which R is n-butyl, $R_6$ is methyl and $R_7$ is n-propyl.

35. A compound according to claim 22 in which R is methyl, $R_6$ is ethyl and $R_7$ is n-butyl.

36. A compound according to claim 1 in which R is methyl, X is sulfur, $R_1$, $R_2$, $R_3$, $R_4$, $R_5$ are each hydrogen, $n$ is 1, $R_6$ is hydroxymethyl and $R_7$ is methyl.

37. A compound according to claim 1 in which R is methyl, X is sulfur, $R_1$, $R_2$, $R_3$, $R_4$ and $R_5$ are each hydrogen, $n$ is 1, $R_6$ is chloromethyl and $R_7$ is methyl.

38. A compound according to claim 1 in which R is methyl, X is sulfur, $R_1$, $R_2$, $R_3$, $R_4$ and $R_5$ are each hydrogen, $n$ is 1, $R_6$ is ethylcarbonyloxymethyl and $R_7$ is methyl.

39. A compound according to claim 1 in which R is methyl, X is sulfur, $R_1$, $R_2$, $R_3$, $R_4$ and $R_5$ are each hydrogen, $n$ is 1, $R_6$ is t-butylcarbonyloxymethyl and $R_7$ is methyl.

40. A compound according to claim 1 in which R is methyl, X is sulfur, $R_1$, $R_2$, $R_3$, $R_4$ and $R_5$ are each hydrogen, $n$ is 1, $R_6$ is N-methylcarbamoyloxymethyl and $R_7$ is methyl.

41. A compound according to claim 1 in which R is methyl, X is sulfur, $R_1$, $R_2$, $R_3$, $R_4$ and $R_5$ are each hydrogen, $n$ is 1, $R_6$ is N-phenylcarbamoyloxymethyl and $R_7$ is methyl.

42. A compound according to claim 1 in which R is methyl, X is sulfur, $R_1$, $R_2$, $R_3$, $R_4$ and $R_5$ are each hydrogen, $n$ is 1, $R_6$ is t-butylthiocarbonyloxymethyl and $R_7$ is methyl.

43. A compound according to claim 1 in which R is benzyl, X is sulfur, $R_1$, $R_2$, $R_3$, $R_4$ and $R_5$ are each hydrogen, $n$ is 1, $R_6$ is methyl and $R_7$ is methyl.

References Cited
UNITED STATES PATENTS 3,641,060   2/1972   Nakanishi _____ 260—340.7

NICHOLAS S. RIZZO, Primary Examiner

J. H. TURNISPEED, Assistant Examiner

U.S. Cl. X.R.

71—88; 260—340.9